US006912660B1

(12) United States Patent
Petrogiannis (10) Patent No.: US 6,912,660 B1
(45) Date of Patent: Jun. 28, 2005

(54) METHOD FOR PARALLEL APPROVAL OF AN ELECTRONIC DOCUMENT

(75) Inventor: Tommy Petrogiannis, Montreal (CA)

(73) Assignee: Silanis Technology Inc., Quebec (CA)

( * ) Notice: Subject to any disclaimer, the term of this patent is extended or adjusted under 35 U.S.C. 154(b) by 0 days.

(21) Appl. No.: 09/369,734

(22) Filed: Aug. 6, 1999

(30) Foreign Application Priority Data

Aug. 7, 1998 (CA) .............................. 2242130

(51) Int. Cl.$^7$ ................................ H04L 9/00
(52) U.S. Cl. ...................... 713/181; 713/180; 713/165; 713/166
(58) Field of Search ................................ 713/180, 181, 713/165, 166, 66; 705/51, 52

(56) References Cited

U.S. PATENT DOCUMENTS

| | | | | | |
|---|---|---|---|---|---|
| 5,673,320 | A | * | 9/1997 | Ray et al. .................... | 713/176 |
| 5,764,762 | A | * | 6/1998 | Kazmierczak et al. ........ | 705/52 |
| 6,128,737 | A | * | 10/2000 | Jakubowski et al. ........ | 713/181 |
| 6,236,972 | B1 | * | 5/2001 | Shkedy .......................... | 705/1 |

FOREIGN PATENT DOCUMENTS

| EP | 0 565 314 A2 | | 10/1993 | | |
|---|---|---|---|---|---|
| JP | 403004361 A | * | 1/1991 | .......... | G06F/15/20 |
| WO | WO 98/03927 | | 1/1998 | | |

\* cited by examiner

Primary Examiner—Gilberto Barrón
Assistant Examiner—Grigory Gurshman
(74) Attorney, Agent, or Firm—Jones Day (57) ABSTRACT

A computer-based system providing for the electronic approval of documents in parallel. An electronic document is issued for approval by a user at one point in time at some location. It can subsequently be accessed by other users, who can then electronically approve the documents simultaneously or serially. The technology alerts users to any unauthorized modifications which may have been made to the document during subsequent approvals. A document authentication code (DAC 0) is generated, linked to the original document. Subsequent approvals of the document generate a DAC x related to that specific approval as well as approval information such as an individual's handwritten signature as well as any other identifying information (Name, date and time of signing, biometrics, voice, fingerprint, picture, etc.) which may be required for the approval process. If the DAC generated for each subsequent approval matches the DAC 0, the approval is validated, optionally encrypted and stored in an Approval Data Packet (ADP) along with the approval information. A match in the DACs also confirms that users are working from the same document and that the data has not been changed in the interim (i.e. all users are approving the same document). Should the DACs not match, corrective action may be necessary. The data stored in the ADPs may be incorporated into the original document.

46 Claims, 10 Drawing Sheets

STEP B

METHOD FOR PARALLEL APPROVAL OF AN ELECTRONIC DOCUMENT

FIELD OF THE INVENTION

The present invention relates to the field of electronic approval of a document, and more particularly concerns a method for a secure parallel approval of an electronic document by a plurality of users.

BACKGROUND OF THE INVENTION

There are many computer systems that have been designed to create, store, approve revise or verify data electronically. In this age of sophisticated communications technology, having access to such systems can have a great impact on the way transactions are carried out and information and documents can be exchanged. Moreover, the use of such systems contributes to reducing the costs associated with the use of paper, namely, though not exclusively, in the area of processing data or documents. Considerable time can be saved through the use of electronic submission processes, in which paper-based documentation is replaced by electronic data submissions.

While there exist a great number of systems that can facilitate the creation, serial approval, storage and authentication of documents, there is no known system to date that can enable various users to electronically approve documents in parallel, that is at different times or simultaneously and from different geographic locations. Such a method of approval could be useful for many types of communications, where traditional hand-written approvals would be both costly and time-consuming.

There is considerable variation among existing systems with respect to the scope of the functions they offer. Some are particularly limited in their scope, such as the system disclosed in U.S. Pat. No. 4,933,969 (Marshall et al.) which is concerned primarily with data authentication and storage. This mechanism stores information and protects against unauthorized modifications. While this type of data authentication system contributes greatly to ensuring the security and integrity of data, it lacks the capacity for the approval of documents in parallel.

Some existing systems offer more extensive types of electronic functions. For example, U.S. Pat. No. 5,195,133 to Kapp et al describes a system designed to generate a completed payment document, which can be signed by a customer, and then capture that customer's signature in digital form. The principal feature of this mechanism is that it attempts to ensure that a signature approving a particular document was, in fact, captured at the time of the completion of the transaction to which it relates and was not obtained on some other occasion and merely reproduced for the particular transaction in question. The Kapp et al. patent creates a digital record of the transaction and captures a digital representation of the signature at the time the transaction is completed. This system then uses this digital record to encrypt the digital representation of the signature. This system does not verity if any unauthorized changes were made to the text after the signature was affixed. It also lacks any capacity for parallel approval of a document, irrespective of time and location.

Other existing electronic signature methods provide for the creation of an electronic signature for a particular signer only, and cannot be used for any document other than the one that is the object of the signature (see U.S. Pat. No. 5,689,567 to Miyauchi). Another method operates to authenticate and verify users on a network (U.S. Pat. No. 5,706,427 to Tabuki). The aforementioned systems, albeit useful for certain purposes, do not allow for the parallel approval of electronic documents by multiple users, either simultaneously or serially.

While each of the aforementioned systems can be useful for electronic commercial transactions, they all have certain limitations. These systems do not have the capacity to enable parallel approvals. Current technology requires that any multiple approvals be done in serial fashion, something that is not always practical or feasible. Thus, under the existing methods, it is not possible for various users to access or approve the same document, at the same time, or in parallel, from different locations, in a secure manner. Moreover, there is no existing method in which an electronic approval has the effect of modifying the approval authorization code, a process that, in effect, creates a new document with each new approval.

There are many situations where parallel approval is necessary. Some such examples could include situations where contracts must be approved by numerous parties who may be situated in different locations and who cannot meet in the same place at the same time. In such an instance parallel approval can contribute greatly to reducing travel and communication costs.

This technology can be used extensively in the defense and pharmaceutical industries, for example, and by any global enterprises or organizations in which collaboration among numerous parties is required. Through the use of this system, several people could electronically approve the same document, different documents or parts of a document. Optionally, using a merge method, parts of a document or different documents could be merged into one single electronic document with all approvals preserved.

Clearly then, there is a need for an approval system that better reflects contemporary commercial practice whereby multiple users can access and approve electronic documents in parallel and from different locations, without compromising the security and integrity of the documents that are being approved.

SUMMARY OF THE INVENTION

The present invention provides an integrated method and system for the electronic approval of electronic documents in parallel. It is designed to facilitate the electronic creation, approval and transportation of documents by multiple users, independently of variables such as time or geographic location. Thus, multiple users, each situated in different places, may electronically approve the same document in parallel, by various means of distribution (i.e. e-mail, network or Internet), either within an enterprise or between several enterprises.

Another key feature of the present invention is the fact that it ensures the security and integrity of the data. If one party attempts to modify the data contained in a document after it has already been approved by another party, the system warns the user that the document has been changed without permission. Users can thus be certain that once they approve a document no unauthorized alterations or modifications can be made.

Accordingly, the present invention provides a method for parallel approval of an electronic document by a plurality of users, comprising the steps of:

A) generating an original Data Authentication Code, hereinafter referred to as "DAC 0", embedded or linked to the electronic document;

B) making the electronic document to available to each user; and

C) for approval by each user, performing the sub-steps of:
  i) opening the electronic document for approval;
  ii) retrieving DAC 0;
  iii) approving the electronic document;
  iv) generating for the electronic document an approval Data Authentication Code, hereinafter referred to as "DAC x";
  v) comparing DAC x to DAC 0, and proceeding with the approval only if DAC x is equal to DAC 0; and
  vi) storing approval information in a user Approval Data Packet, hereinafter referred to as "ADP x".

A step D) consisting of incorporating the approval information into the electronic document may also be included.

The security features built into this system and the capacity for parallel approval present particular advantages for those who frequently deal with sensitive and highly confidential material, but for whom it is not always possible to have all signers present in the same place at the same time for approval. This technology has therefore particular application in the case of parallel approvals, i.e. situations where several individuals, each situated in a different geographic location wish to approve a document in parallel but also wish to ensure that they are all approving the same unmodified document. In such cases, each approval will generate a DAC on the document being approved along with additional information such as audit information, (i.e. date and time of signing, name of signer) and hand-written signature, or other identifying items such as voice and fingerprints, photograph or biometric data etc. The original DAC will then be compared to the DAC generated by the user. If they match, this will confirm that every user approving the document is actually approving the same information and that the data has not been changed between approvals by the different users. Should the DACs not match, this would indicate that the data has been altered without the proper approval and corrective action would then be necessary.

In accordance with an alternative embodiment, the present invention provides a method for parallel approval of an electronic document by a plurality of users, comprising the steps of:

A) generating an original Data Authentication Code, hereinafter referred to as "DAC 0", linked to the electronic document;

B) making the electronic document available to each user;

C) for approval by each user, performing the sub-steps of:
  i) opening the electronic document for approval;
  ii) approving the electronic document;
  iii) generating for the electronic document an approval Data Authentication Code, hereinafter referred to as "DAC x";
  iv) storing approval information in a user Approval Data Packet, hereinafter referred to as "ADP x"; and D) for authenticating the approval by each user, performing for each DAC x the sub-steps of:
  i) retrieving DAC 0 and DAC x; and
  ii) comparing DAC x to DAC 0, and accepting the approval only if DAC x is equal to DAC 0.

According to yet another embodiment of the invention there is provided a method for parallel approval of sections of an electronic document by a plurality of users, the method comprising the steps of:

A) generating for each section of the electronic document an original section Data Authentication Code, hereinafter referred to as "DACs 0", linked to said section of the electronic document;

B) making the electronic document available to each user; and

C) for approval by each user of corresponding sections of the electronic document, performing the sub-steps of:
  i) opening the electronic document for approval;
  ii) selecting the corresponding sections for approval;
  iii) retrieving DACs 0 linked to the each of the corresponding sections of the electronic document;
  iv) approving the corresponding sections of the electronic document;
  v) generating for each of the corresponding sections a section approval Data Authentication Code, hereinafter referred to as "DACs x";
  vi) comparing the DACs x to the corresponding DACs 0, and proceeding with the approval only if in each case DACs x is equal to DACs 0; and
  vii) storing approval information in a user Approval Data Packet, hereinafter referred to as "ADP x".

In yet another embodiment, the present invention provides a method for parallel approval of sections of an electronic document by a plurality of users, each section being approved by a single user, the method comprising the steps of:

A) making the electronic document available to each user; and

B) for approval by each user of a corresponding section of the electronic document, performing the sub-steps of:
  i) opening the electronic document for approval;
  ii) selecting the corresponding section for approval;
  iii) approving the corresponding section of the electronic document;
  iv) generating for the corresponding section a section approval Data Authentication Code, hereinafter referred to as "DACs x";
  v) storing approval information in a user Approval Data Packet, hereinafter referred to as "ADP x".

Finally, another embodiment is provided concerning a method of merging a plurality of approved electronic documents into a single approved master document, the method comprising the steps of:

A) approving the electronic documents by performing, for each of said electronic documents, the sub-steps of:
  i) generating an original Data Authentication Code, hereinafter referred to as "DAC 0", linked to the electronic document;
  ii) having the electronic document made available to each user;
  iii) for approval by each user, performing the sub-steps of:
    a) opening the electronic document for approval;
    b) approving the electronic document;
    c) generating for the electronic document an approval Data Authentication Code, hereinafter referred to as "DAC x";
    d) storing approval information in a user Approval Data Packet, hereinafter referred to as "ADP x";

B) generating the master document;

C) generating a master Data Authentication Code and a master Approval Data Packet, respectively hereinafter referred to as "DACm 0", and ADPm, both linked to said master document; and D) for merging of each electronic document, performing the sub-steps of:
  i) opening the electronic document;
  ii) retrieving the DAC 0 and DAC x linked to said electronic document;

iii) comparing DAC x to DAC 0, and proceeding only if DAC x is equal to DAC 0; and iv) incorporating the electronic document into the master document;

v) generating a new Data Authentication Code, hereinafter referred to as "DACm 0'" linked to the master document incorporating said electronic document; and vi) storing ADP x corresponding to said electronic document into ADPm.

The present invention and its advantages will be better understood upon reading the following non-restrictive description of embodiments thereof with reference to the accompanying drawings.

DESCRIPTION OF PREFERRED EMBODIMENTS OF THE INVENTION

Figures 1, 1A:
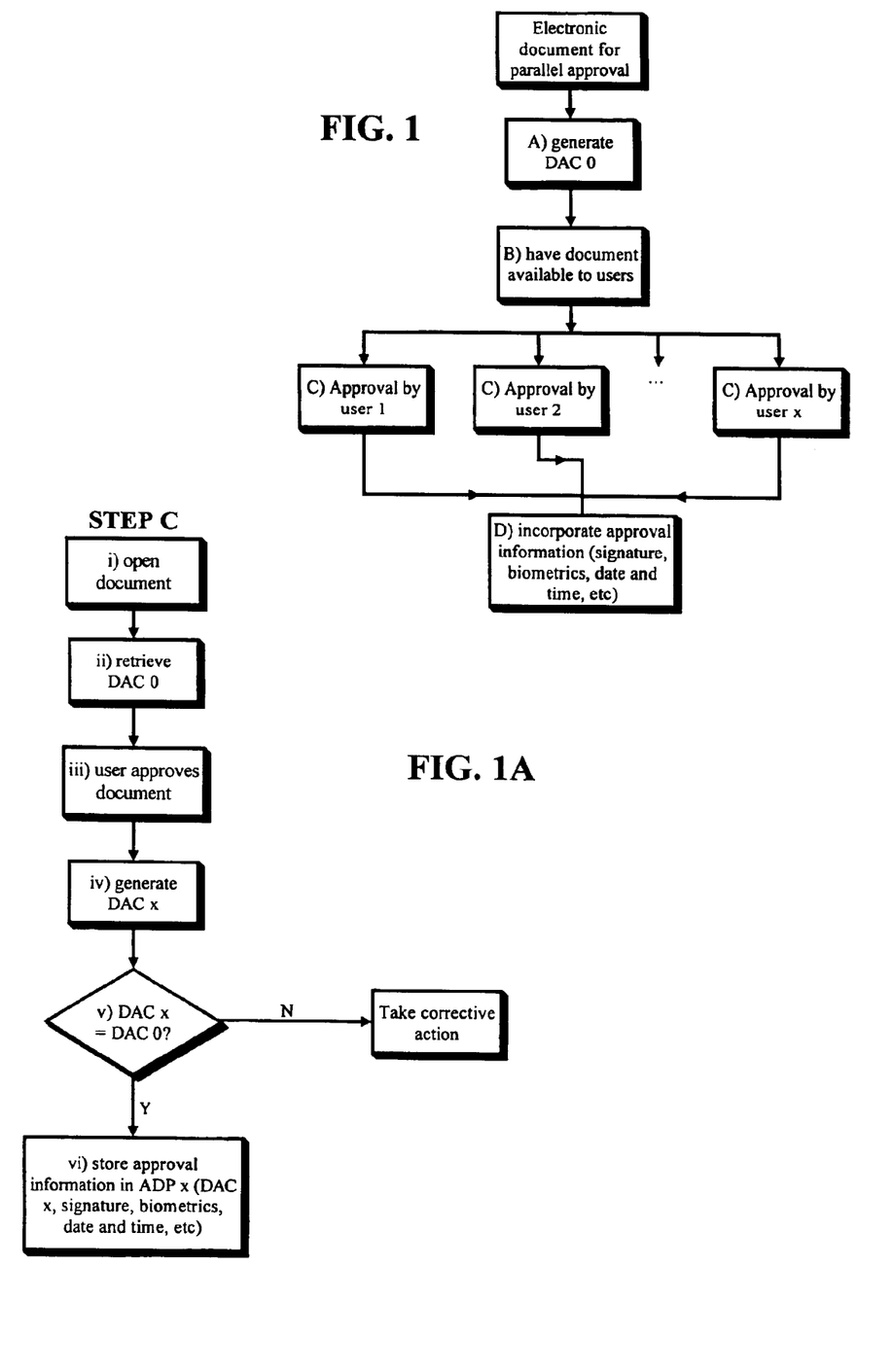
FIG. 1 is a flow chart representing the main steps of a method for parallel approval of an electronic document in accordance with a preferred embodiment of the present invention.
FIG. 1A is a flow chart detailing step C of the method of FIG. 1.
Figure 1B:
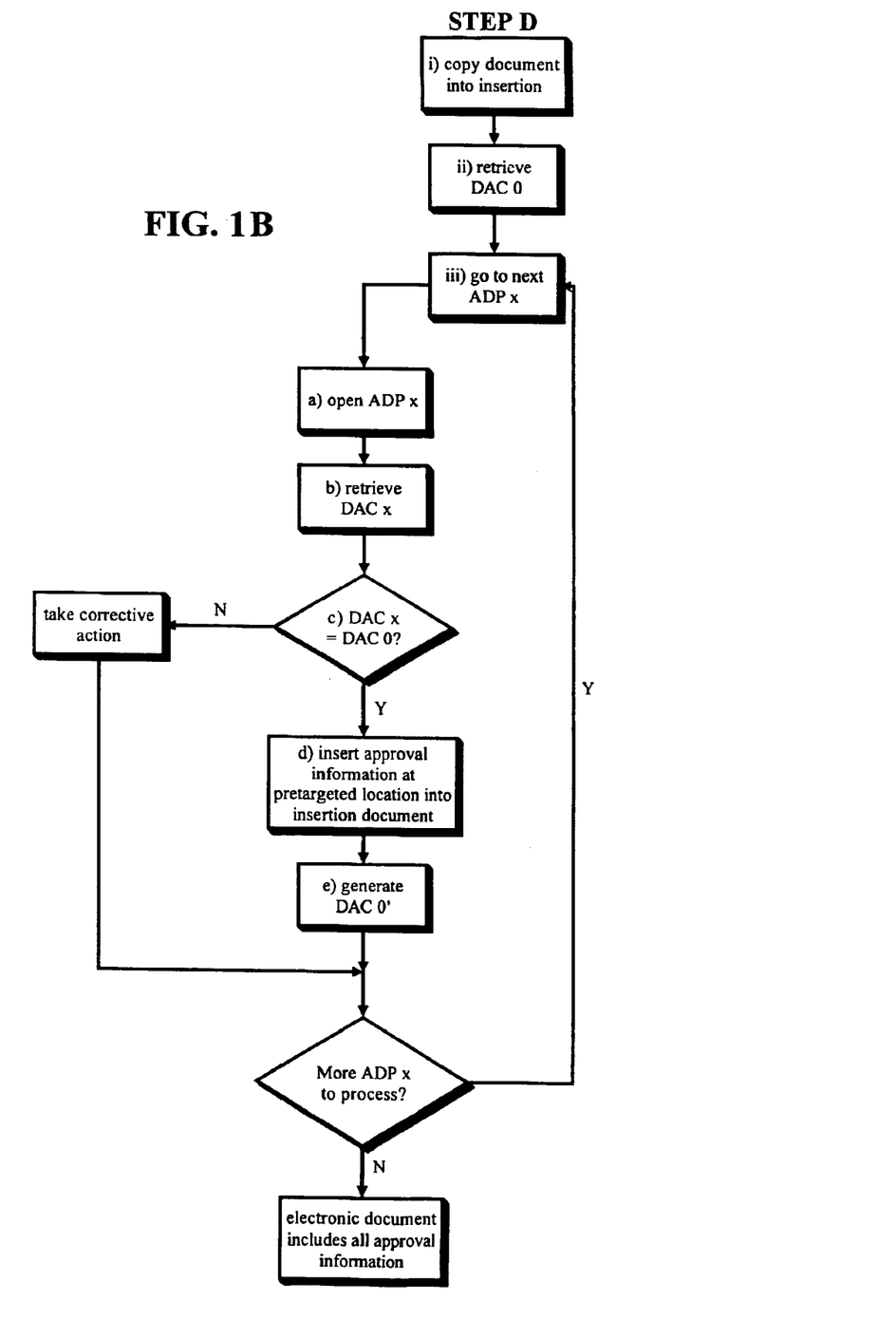
FIG. 1B is a flow chart detailing step D.

Referring to FIGS. 1, 1A and 1B, the steps of a first method for the electronic approval of a document by multiple users in parallel are shown. It should be noted that when used herein, the term "electronic approval" means the process of electronically approving documents and includes capabilities for the control, management and security of the entire approval process. Electronic approval encompasses more than an "electronic signature," which refers only to an electronic representation of the person having approved the document.

Step A) of the method of FIG. 1 consists of generating an original Data Authentication Code, "DAC 0", that is linked to the electronic document. The DAC is preferably generated through the use of a one way hash function, but may generally consist of any code representing the electronic document in such a manner that modifying the document would result in a different representative code. DAC 0 may either be stored inside the document (i.e. embedded) or made available to users through a linked storage system.

In accordance with step B) the electronic document is made available to the users. It may for example be transmitted via electronic mail, be accessible on a network or the internet, etc. Each user may therefore independently access the document and approve it.

Step C) consists of the actual approval of the document by the users. Advantageously the document is approved by each user in parallel, not sequentially, while still ensuring that the same unmodified document is approved by every user. As illustrated in FIG. 1A, when each user approves the document the following sub-steps are performed:

i) The document is opened and accessed by the user.

ii) DAC 0 is retrieved. It is understood that this sub-step may be performed at any point in step C, before DAC 0 is actually used, and its inclusion at this particular point in the sequence is in no way limiting.

iii) The user approves the document. Data representing approval information are generated at this point. These data could include an image of the individual's hand-written signature, and related audit information, such as the date and time of signing, the name and title of the signer, picture, finger print, voice print or other biometrics or such other identifying information that may be required for the approval process.

iv) A new DAC x related to the specific approval is generated. DAC x is created in the same manner as DAC 0, and is representative of the document that has been approved by the particular user. It may also be included in the approval information referred to above.

v) The DACs are compared to each other. If DAC x=DAC 0, then the approved document is verified as the right document without any unauthorised modification, and the approval is recognized as valid and may be recorded. If not, then the document is not the same and the approval cannot be recorded; corrective actions are to be taken.

vi) The approval information referred to in sub-step iii) is stored in a related Approval Data Packet, hereinafter referred to as ADP x, which is perpetually linked to the approved document. It is usually preferable to have ADP x encrypted so the information it contains cannot be accessed without proper authorization.

After the parallel approvals, the ADPs generated through this process can either be stored in a linked storage system or sent to a merge system designed to incorporate the ADPs into the original document (i.e., embedded in the document). With the merge system, once all the approvals have been completed, the ADPs can be processed to incorporate the original approval information back into the original document. Since the addition of each approval information has the effect of changing the content of the document, the DACs of the original document must be modified with each approval that is incorporated. In effect, the approval and audit trail information from the ADP would have to be added to the original document. With the incorporation of each ADP, the DAC must be modified accordingly.

The merging of the approval information into the electronic document can be done through an optional step D, illustrated in FIG. 1B. According to this step, sub-steps of i) copying the document into an insertion document and ii) retrieving DAC 0 are first performed. The ADP are then processed sequentially in accordance with sub-step iii). In each case ADP x is opened and DAC x is retrieved. Then DAC x is compared to DAC 0, and if they match, the appropriate approval information stored in ADP x is inserted into the document. If the DACs do not match then corrective action is again to be taken. Inserting the approval information into the electronic document of course modifies the document, and a new data authentication code DAC 0' has to be generated. Of course, DAC x is compared with the DAC 0 of the original document, still unmodified, so that it effectively represents the document as approved by the user.

It should be noted that the DACs having been compared already in step C, it is not necessary in every case to check them again in step D. The corresponding sub-step may therefore be omitted if the degree of security required does not warrant it.

The process of inserting approval information into the original document could be carried out through the use of a Dynamic Data Manifestation process. Under this method, user data is extracted from the ADP and subsequently inserted into pre-targeted viewable locations of the electronic document. These locations would include, in the case of most business forms for example, a signature location containing an area for the signer's name, title and date or other relevant data required for the approval. The type of data that are required for approval can vary however. This method will allow these data to be inserted into these locations without invalidating the DAC. In order for this process to be successful, the technology first verifies the DAC before the Dynamic Data Manifestations are applied. If the electronic document verifies, the new data are inserted into these pre-targeted locations. A new DAC is then created for the modified document containing the approval data. The original DAC can be stored for reference purposes or to validate the DAC contained in the ADP.

The sub-steps of step D) may be repeated to incorporate every desired approvals into the document. If no other approvals are to be added, the electronic document and approvals can be used, published or archived.

It is understood that when applying the present invention in any of its embodiments encryption may be used to protect any data involved, if additional security is required. As mentioned, the ADP x and all information therein are preferably encrypted. One may also choose to encrypt DAC 0 and the individual DAC x. However, the present invention does not lie in the step of encrypting (or not encrypting) a part or all of the various steps described herein, since encryption is a well known technique in the field.

Figure 2:
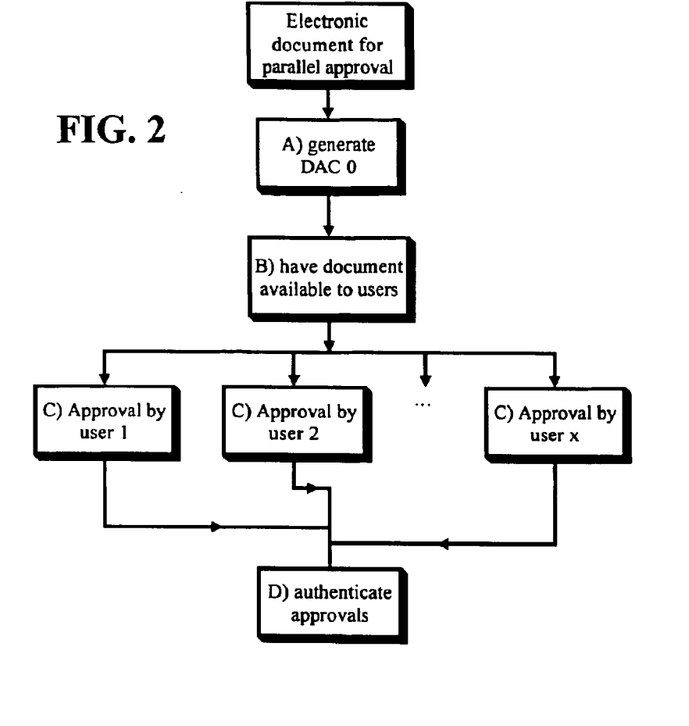
FIG. 2 is a flow chart representing the main steps of a method for parallel approval of an electronic document in accordance with an alternative embodiment of the present invention.
Figure 2A:
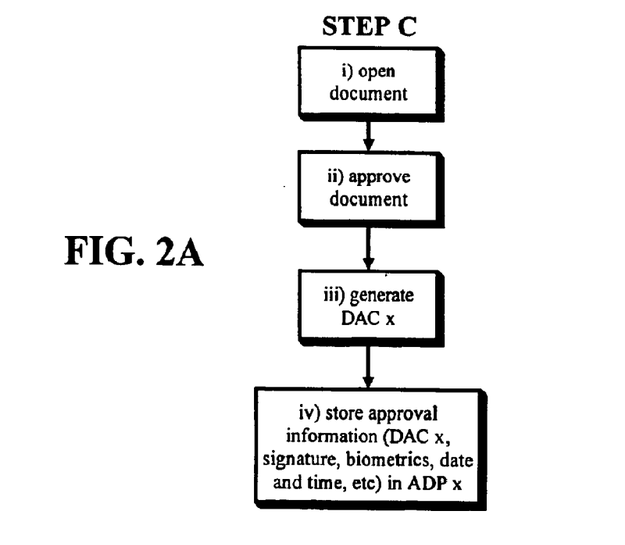
FIG. 2A is a flow chart detailing step C of the method of FIG. 2.
Figure 2B:
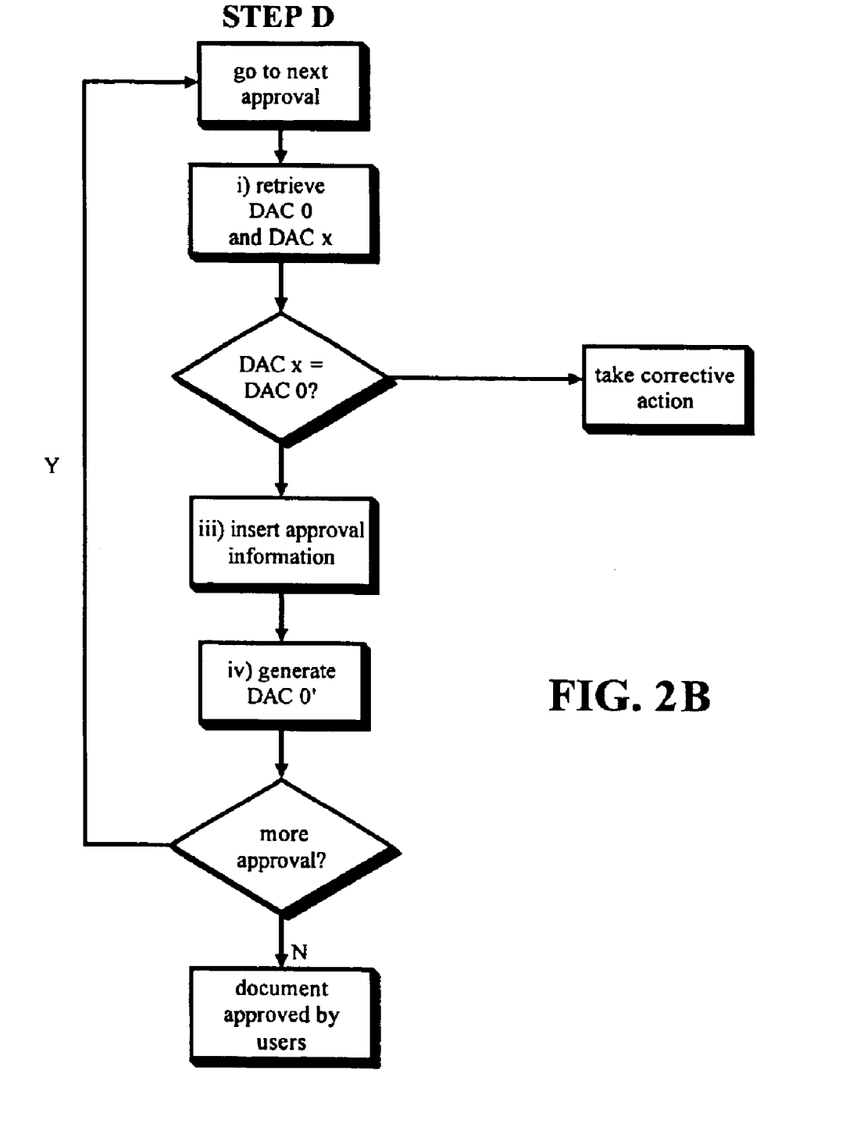
FIG. 2B is a flow chart detailing step D.

In an alternative embodiment of the invention, the verification sub-step during the actual approval of the document may be omitted in favour of a later verification step taking place once all approvals have been recorded. This embodiment is illustrated in FIGS. 2, 2A and 2B. This method first differs from the one described above in that step C) only includes sub-steps of i) opening the document, ii) approving the document, iii) generating DAC x and iv) storing approval information into ADP x (see FIG. 2A). An authentication step D) is then performed, which involves, for each approval, i) retrieving DAC 0 and the appropriate DAC x, and ii) comparing them to see if they match (FIG. 2B). Optionally, the approval information stored in ADP x may be included in the document at this point and a new DAC 0' is generated.

In another embodiment the present invention provides a method allowing the parallel approvals to be configured in such a way as to allow users to approve sections of an electronic document. A "section" of a document means a particular portion of a single document, or in a multi-file document, it could mean a particular file or particular section in a file or multiple files, or a combination of the above. This embodiment can be realized using different $DAC_s$'s for different sections of the electronic document. Thus, one $DAC_s$ could refer to a particular section of a document, or a particular file or particular section of a file in the case of a multi-file document. Each $DAC_s$ may or may not be predefined. If not predefined, there are numerous options available to the user in determining the section that is to be approved. For example, the original document may have user information embedded in it that would allow it to determine which sections the user is approving. Alternatively, the user can indicate on the document the sections that are to be approved. This can be done either by selecting the desired sections or having a list of sections indicating which ones are to be used to generate the $DAC_s$. Also, a specific user can approve any number of sections of the document, and a single section may be approve by a plurality of users, the invention allowing any possible combination of users-sections. The $DAC_s$ is then created based on the sections that have been chosen. The corresponding ADP containing the sectional DAC and associated approval information will then be generated and incorporated into the original document or stored together with the original electronic document.

Figure 3:
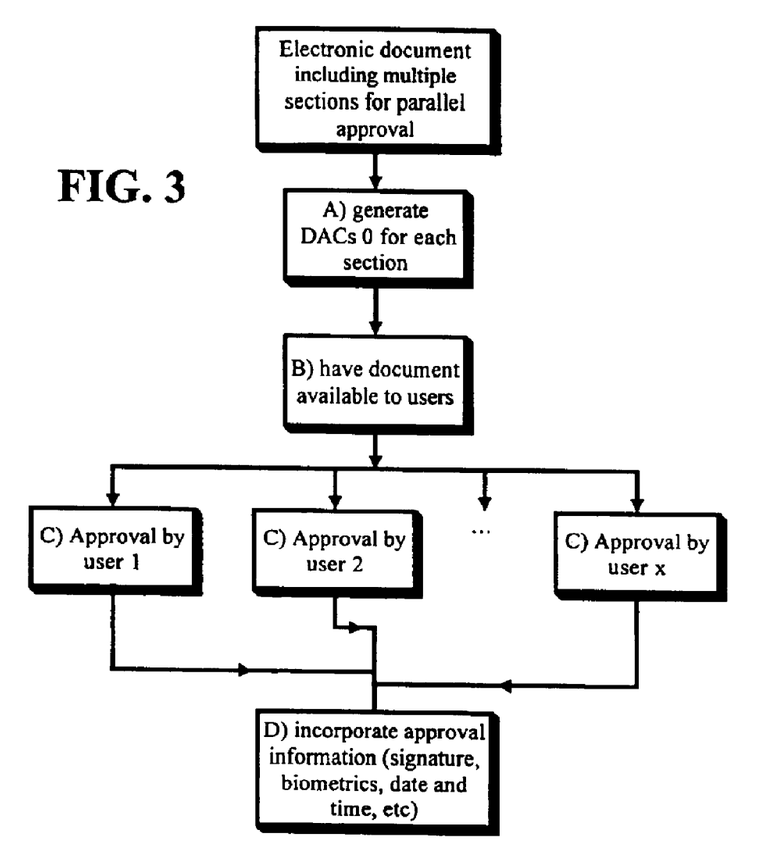
FIG. 3 is a flow chart representing the main steps of a method for parallel approval of sections of an electronic document in accordance with another embodiment of the present invention.
Figure 3A:
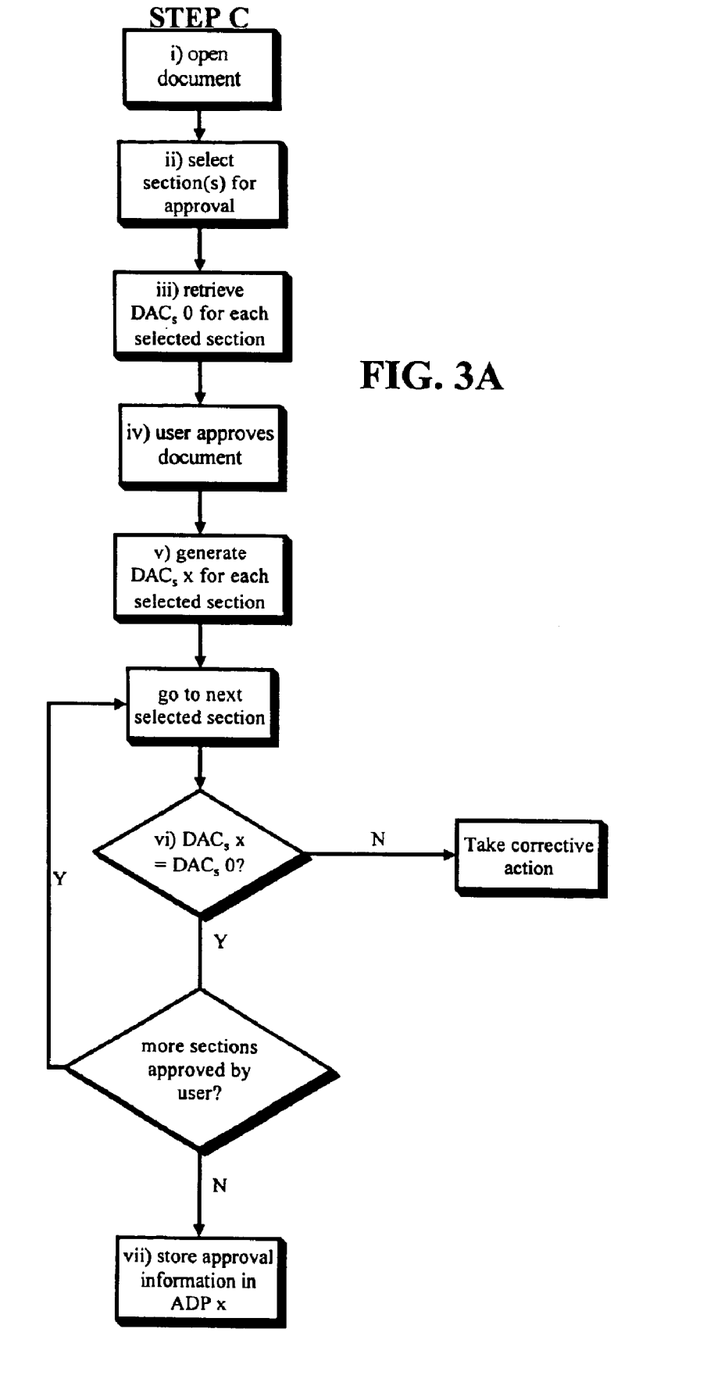
FIG. 3A is a flow chart detailing step C and FIG. 3B is a flow chart detailing step D.
Figure 3B:
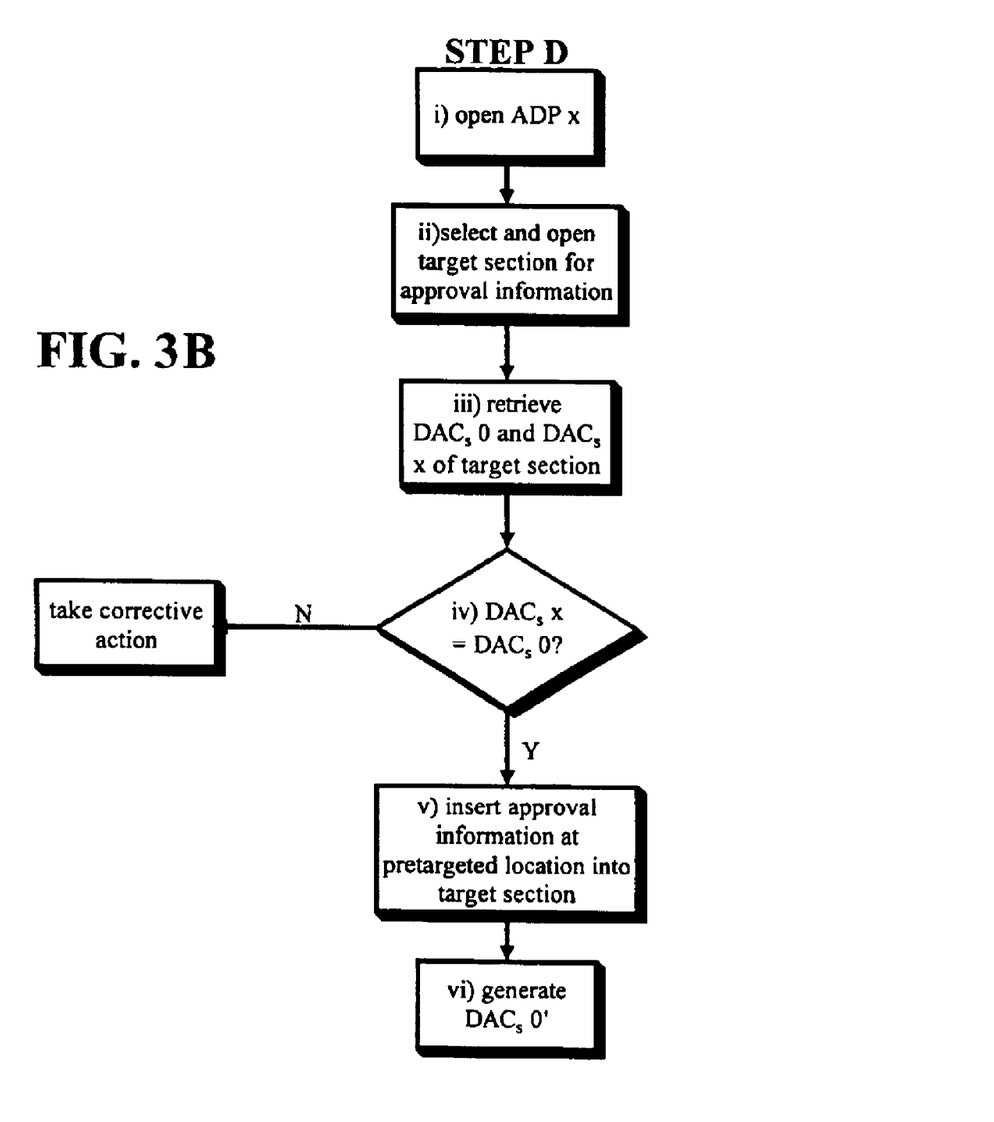

FIGS. 3, 3A and 3B illustrate a method for the parallel approval of sections of a document as described above, wherein the $DAC_s$'s are predefined. The method therefore includes a step A) of generating a $DAC_s$ 0 for each section of the document. The document is then B) made available to each user as before, and C) each user approves the corresponding sections. The particular sections corresponding to each particular user may be predetermined, or chosen by the user himself. Referring to FIG. 3A, it may be seen that the sub-steps of step C) are similar to those of the similar steps described above, with the exception that multiple sections may be dealt with according to the following steps:

i) opening the electronic document for approval;
ii) selecting the corresponding sections for approval;
iii) retrieving each $DAC_s$ 0 linked to the corresponding sections of the electronic document;
iv) approving the corresponding sections of the electronic document;
v) generating a $DAC_s$ x for each corresponding section;
vi) comparing the $DAC_s$ x to the corresponding $DAC_s$ 0, and proceeding with the approval only if in each case $DAC_s$ x is equal to $DAC_s$ 0; and
vii) storing approval information in ADP x.

As with the previous embodiments, the above method may include an optional step D) of incorporating approval information from the ADP x into the original document. This step is illustrated in FIG. 3B. In this case, for each approval to be inserted, the related ADP x is first opened, and the target section where the approval information is to be approved is selected and opened. The target section may or may not correspond to the section approved by the user considered. The $DAC_s$ of the sections approved by this user are then retrieved and compared. If they match, the appropriate information is inserted into the target section and a new $DAC_s$ 0' is generated for that section. Otherwise corrective action is to be taken.

In a variant of the above embodiment, comparing of the DACs may be omitted. In addition, Dynamic Data Manifestations as described above, may optionally be used to insert the approval information into the document.

Figure 4:
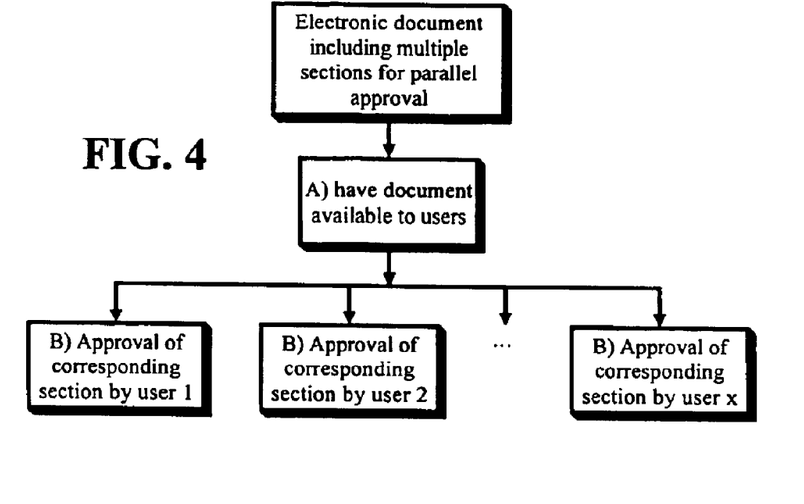
FIG. 4 is a flow chart representing the main steps of a method for parallel approval of sections of an electronic document, wherein each section is approved by a single user, in accordance with yet another embodiment of the present invention.
Figure 4A:
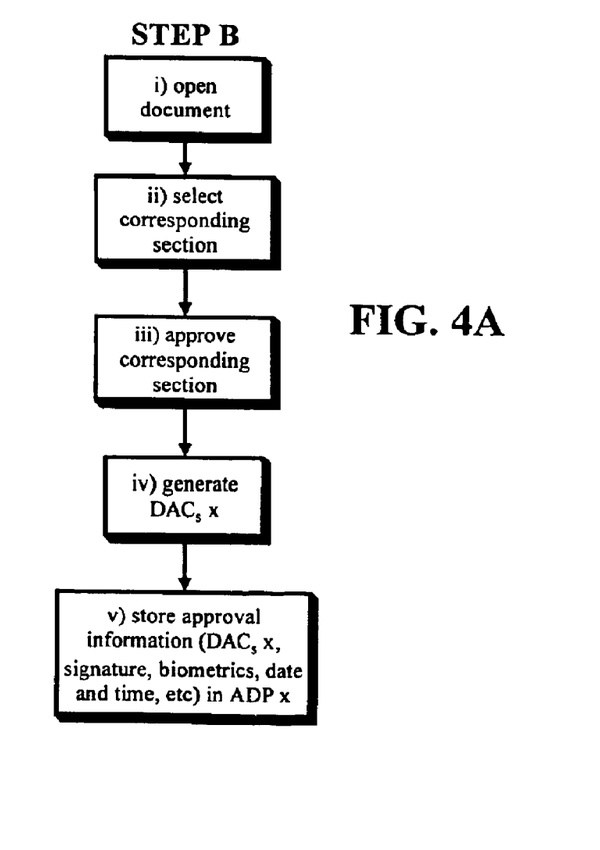
FIG. 4A is a flow chart detailing step B of the method of FIG. 4.

Referring to FIGS. 4 and 4A, an embodiment concerning a method for the parallel approval of sections of a document where each section is approved by a single user is illustrated. In this embodiment, each user is responsible for his own section, and may modify it before he approves it and a DAC x is generated. In this embodiment the document is first made available to each user. Then each section is approved by one user through the following steps (FIG. 4A):

i) the document is opened;
ii) a section corresponding to the particular user is selected. The user may work on his assigned section and modify it;
iii) the user approves his section;
iv) a $DAC_s$ x is generated for the approved section;
v) approval information is stored in an ADP x.

In this manner, the obtained document includes a plurality of sections each having been used and approved by the proper person.

Figure 5:
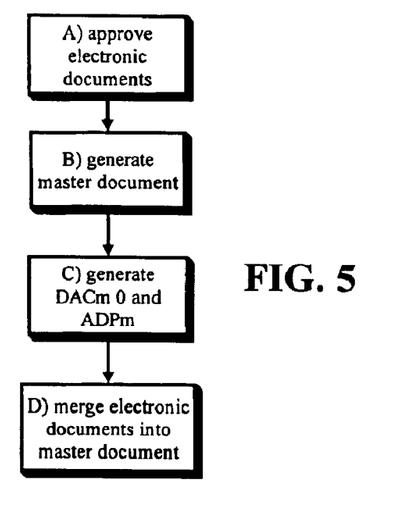
FIG. 5 is a flow chart representing the main steps of a method for merging electronic documents approved in parallel into a single approved document.
Figure 5A:
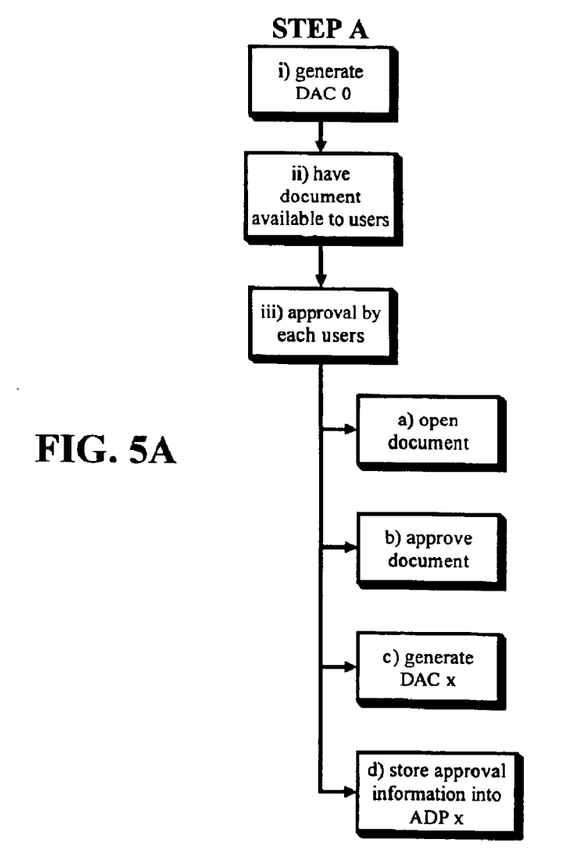
FIG. 5A is a flow chart detailing step A and FIG. 5B is a flow chart detailing step D.
Figure 5B:
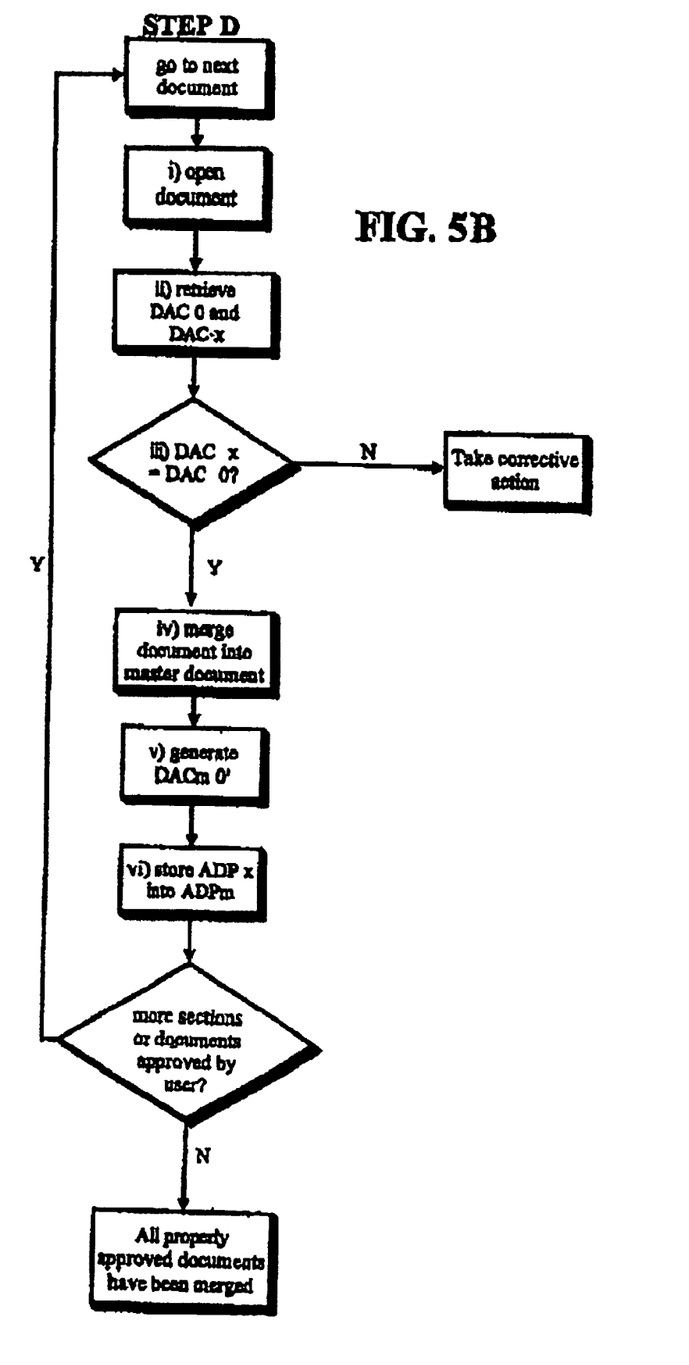

Referring to FIGS. 5, 5A and 5B, another option available to users is to approve multiple separate documents and then have them merged into one single approved document. With this method, separate documents are approved by the users, with separate approvals generated for each document. An ADP is then created for each approval. Each approved document can be subsequently incorporated into a master document. If there are several files to merge, each approved document is verified. If the document verifies, the contents of each approved document and ADP are then extracted and securely merged into a master document without invalidating the approval or altering the contents of the data. The master document includes its own DAC which may be modified when incorporating new data. The audit trail information associated with each ADP is subsequently embedded into the master approval record ADPm. The document can then be used, archived or published.

An example of where the present invention might apply is in the pharmaceutical industry, where several people may be responsible for testing different elements of proposed pharmaceutical products. Each may electronically submit to the Food and Drug Administration separate documents attesting to their results. This technology enables all electronic submissions to be merged into one document containing all of the information from the individual tests, thus facilitating the submissions process.

The present invention can be used for many other purposes as well. For example, it can be useful in the context of internal business communications, namely internal office memos or requisition orders. By replacing the traditional hand-written approvals with this parallel electronic approval method, paper costs may be drastically reduced, the time-consuming procedure of processing paper-based information can be eliminated, and overall productivity can be increased. This technology therefore presents great advantages to this industry.

Similarly, electronic approval technology can be used in a beneficial way in any enterprise or organization, where multiple parties are involved in approving the same document, different documents or parts of a document, without compromising the security and integrity of the documents that are being approved.

Of course, numerous changes could be made to the preferred embodiments disclosed hereinabove without departing from the scope of the invention as defined in the appended claims.

What is claimed is:

1. A method for parallel approval of an electronic document by a plurality of users, comprising the steps of:

A) generating an original Data Authentication Code, hereinafter referred to as "DAC 0", linked to the electronic document;

B) making the electronic document available to each user of said plurality of users; and C) having each user of said plurality of users parallelly approve said electronic document, by performing the sub-steps of:
  i) opening the electronic document for approval;
  ii) retrieving DAC 0;
  iii) said user approving the electronic document by generating approval information;
  iv) generating for the electronic document an approval Data Authentication Code, hereinafter referred to as "DAC x";
  v) comparing DAC x to DAC 0, and proceeding with the approval only if DAC x is equal to DAC 0; and
  vi) storing said approval information in a user Approval Data Packet, hereinafter referred to as "ADP x".

2. The method of claim 1, further comprising an additional step of:

D) incorporating the approval information from each ADP x into the electronic document.

3. The method of claim 2, wherein step D) comprises the sub-steps of:
  i) copying the electronic document into an insertion electronic document;
  ii) retrieving DAC 0; and
  iii) for each ADP x, performing the sub-steps of:
    a) opening ADP x;
    b) retrieving DAC x;
    c) comparing DAC x to DAC 0, and proceeding only if DAC x is equal to DAC 0;
    d) inserting approval information stored in ADP x into the insertion electronic document; and
    e) generating a new Data Authentication Code, hereinafter referred to as "DAC 0'", linked to the insertion electronic document.

4. The method of claim 3, wherein sub-step D) iii) d) comprises including the approval information at a pre-targeted location in the insertion electronic document.

5. The method of claim 2, wherein step D) comprises the sub-steps of:
  i) opening the electronic document;
  ii) for each ADP x, performing the sub-steps of:
    a) opening ADP x;
    b) inserting approval information stored in ADP x into the electronic document, thereby generating a modified electronic document; and
    c) generating a new Data Authentication Code, hereinafter referred to as "DAC 0'", linked to the modified electronic document.

6. The method of claim 5, wherein the inserting of sub-step D) iii) d) comprises including the approval information at a pre-targeted location in the electronic document.

7. The method of claim 1, wherein sub-step C) vi) comprises encrypting ADP x.

8. The method of claim 1, wherein step A) comprises encrypting DAC 0.

9. The method of claim 1, wherein substep C) vi) comprises storing DAC x in ADP x.

10. The method of claim 1, wherein, in substep C) iii), the approval information comprises a signature of the user.

11. The method of claim 1, wherein, in substep C) iii), the approval information comprises biometric information related to the user.

12. The method of claim 1, wherein, in substep C) iii), the approval information comprises a date and a time at which substep C) iii) was executed.

13. A method for parallel approval of an electronic document by a plurality of users, comprising the steps of:

A) generating an original Data Authentication Code, hereinafter referred to as "DAC 0", linked to the electronic document;

B) making the electronic document available to each user of said plurality of users;

C) having each user of said plurality of users parallelly approve said electronic document, by performing the substeps of:
   i) opening the electronic document for approval;
   ii) each user approving the electronic document by generating approval information;
   iii) generating for the electronic document an approval Data Authentication Code, hereinafter referred to as "DAC x";
   iv) storing said approval information in a user Approval Data Packet, hereinafter referred to as "ADP x"; and D) authenticating the approval by each user, by performing for each DAC x the sub-steps of:
   i) retrieving DAC 0 and DAC x; and
   ii) comparing DAC x to DAC 0, and accepting the approval only if DAC x is equal to DAC 0.

14. The method of claim 13, further comprising the steps of:
   E) inserting approval information stored in ADP x for each user into the electronic document, thereby generating a modified electronic document; and
   F) generating a new Data Authentication Code, hereinafter referred to as "DAC 0'", linked to the modified electronic document.

15. The method of claim 13, wherein sub-step C) iv) comprises encrypting ADP x.

16. The method of claim 13, wherein step A) comprises encrypting DAC 0.

17. The method of claim 13, wherein sub-step C) iv) comprises storing DAC x in ADP x.

18. The method of claim 13, wherein, in sub-step C) iv), the approval information comprises a signature of the user.

19. The method of claim 13, wherein, in sub-step C) iv), the approval information comprises biometric information related to the user.

20. The method of claim 13, wherein, in sub-step C) ii), the approval information comprises a date and a time at which sub-step C) ii) was executed.

21. A method for parallel approval of sections of an electronic document by a plurality of users, the method comprising the steps of:
   A) generating for each section of the electronic document an original section Data Authentication Code, hereinafter referred to as "$DAC_s$ 0", linked to said section of the electronic document;
   B) making the electronic document available to each user of said plurality of users; and
   C) having each user of said plurality of users parallelly approve corresponding sections of the electronic document, by performing the sub-steps of:
      i) opening the electronic document for approval;
      ii) selecting the corresponding sections for approval;
      iii) retrieving each of the $DAC_s$ 0 linked to the corresponding sections of the electronic document;
      iv) each user approving the corresponding sections of the electronic document by generating approval information;
      v) generating for each corresponding sections a section approval Data Authentication Code, hereinafter referred to as "$DAC_s$ x";
      vi) comparing the $DAC_s$ x to the corresponding $DAC_s$ 0, and proceeding with the approval only if in each case $DAC_s$ x is equal to $DAC_s$ 0; and
      vii) storing said approval information in a user Approval Data Packet, hereinafter referred to as "ADPx".

22. The method of claim 21, further comprising an additional step of: D) incorporating the approval information from each ADP x into the electronic document.

23. The method of claim 22, wherein step D) comprises, for each ADP x, performing the sub-steps of:
   i) opening the ADP x
   ii) selecting and opening a target section of the electronic document wherein the approval information is to be inserted;
   iii) retrieving the $DAC_s$ 0 and $DAC_s$ x corresponding to said target section;
   iv) comparing $DAC_s$ x to $DAC_s$ 0, and proceeding only if $DAC_s$ x is equal to $DAC_s$ 0;
   v) inserting approval information stored in ADP x into the target section of the electronic document, thereby generating a modified section of the electronic document; and
   vi) generating a new section Data Authentication Code, hereinafter referred to as "$DAC_s$ 0'", linked to the modified electronic document.

24. The method of claim 23, wherein the inserting of sub-step D) v) comprises including the approval information at a pre-targeted location in the target section of the electronic document.

25. The method of claim 22, wherein step D) comprises, for each ADP x, performing the sub-steps of:
   i) opening the ADP x
   ii) selecting and opening a target section of the electronic document wherein the approval information is to be inserted;
   iii) inserting approval information stored in ADP x into the target section of the electronic document, thereby generating a modified section of the electronic document; and
   iv) generating a new section Data Authentication Code, hereinafter referred to as "$DAC_s$ 0'", linked to the modified electronic document.

26. The method of claim 25, wherein the inserting of sub-step D) iii) comprises including the approval information at a pre-targeted location in the target section of the electronic document.

27. The method of claim 21, wherein sub-step C) vii) comprises encrypting ADP x.

28. The method of claim 21, wherein step A) comprises encrypting each $DAC_s$ 0.

29. The method of claim 21, wherein sub-step C) vii) comprises storing $DAC_s$ x in ADP x.

30. The method of claim 21, wherein, in sub-step C) iv), the approval information comprises a signature of the user.

31. The method of claim 21, wherein, in sub-step C) iv), the approval information comprises biometric information related to the user.

32. The method of claim 21, wherein, in sub-step C) iv), the approval information comprises a date and a time at which sub-step C) iv) was executed.

33. A method for parallel approval of sections of an electronic document by a plurality of users, each section being approved by a single user, the method comprising the steps of:
   A) making the electronic document available to each user of said plurality of users; and
   B) having each user of said plurality of users parallelly approve a corresponding section of the electronic document, by performing the sub-steps of:

i) opening the electronic document for approval;
ii) selecting the corresponding section for approval;
iii) each user approving the corresponding section of the electronic document by generating approval information;
iv) generating for the corresponding section a section approval Data Authentication Code, hereinafter referred to as "$DAC_s$ x";
v) storing said approval information in a user Approval Data Packet, hereinafter referred to as "ADP x".

34. The method of claim 33, wherein sub-step B) v) comprises encrypting ADP x.

35. The method of claim 33, wherein sub-step B) iv) comprises encrypting $DAC_s$ x.

36. The method of claim 33, wherein sub-step B) v), comprises storing $DAC_s$ x in ADP x.

37. The method of claim 33, wherein, in sub-step B) iii), the approval information comprises a signature of the user.

38. The method of claim 33, wherein, in sub-step B) iii), the approval information comprises biometric information related to the user.

39. The method of claim 33, wherein, in sub-step B) iii), the approval information comprises a date and a time at which sub-step B) iii) was executed.

40. A method of merging a plurality of approved electronic documents or sections of a document into a single approved master document, the method comprising the steps of:
   A) approving the electronic documents by performing, for each of said electronic documents, the sub-steps of:
      i) generating an original Data Authentication Code, hereinafter referred to as "DAC 0", linked to the electronic document;
      ii) having the electronic document made available to each user of a plurality of users;
      iii) having said each user of a plurality of users approve said electronic document by performing the sub-steps of:
         a) opening the electronic document for approval;
         b) each user approving the electronic document by generating approval information;
         c) generating for the electronic document an approval Data Authentication Code, hereinafter referred to as "DAC x";
         d) storing approval information in a user Approval Data Packet, hereinafter referred to as "ADP x";
   B) generating the master document;
   C) generating a master Data Authentication Code and a master Approval Data Packet, respectively hereinafter referred to as "DACm 0", and ADPm, both linked to said master document; and
   D) for merging of each electronic document, performing the sub-steps of:
      i) opening the electronic document;
      i) retrieving the DAC 0 and DAC x linked to said electronic document;
      iii) comparing DAC x to DAC 0, and proceeding only if DAC x is equal to DAC 0; and
      iv) incorporating the electronic document into the master document;
      v) generating a new Data Authentication Code, hereinafter referred to as "DACm 0" linked to the master document incorporating said electronic document; and
      vi) storing ADP x corresponding to said electronic document into ADPm.

41. The method of claim 40, wherein:
sub-step A) iii) c) comprises encrypting ADP x; and
step C) comprises encrypting ADPm.

42. The method of claim 40, wherein:
sub-step A) i) comprises encrypting DAC 0; and
step C) comprises encrypting DACm 0.

43. The method of claim 40, wherein sub-step A) iii) d) comprises storing DAC x in ADP x.

44. The method of claim 40, wherein, in sub-step A) iii) b), the approval information comprises a signature of the user.

45. The method of claim 40, wherein, in sub-step A) iii) b), the approval information comprises biometric information related to the user.

46. The method of claim 40, wherein, in sub-step A) iii) b), the approval information comprises a date and a time at which sub-step A) iii) b) was executed.

* * * * *